(12) United States Patent
Lee

(10) Patent No.: US 11,906,537 B2
(45) Date of Patent: Feb. 20, 2024

(54) WHEEL SENSOR DEVICE FOR VEHICLE

(71) Applicant: HYUNDAI MOBIS CO., LTD., Seoul (KR)

(72) Inventor: Dong Geun Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 282 days.

(21) Appl. No.: 17/575,079

(22) Filed: Jan. 13, 2022

(65) Prior Publication Data
US 2022/0221481 A1 Jul. 14, 2022

(30) Foreign Application Priority Data
Jan. 14, 2021 (KR) .................... 10-2021-0005184

(51) Int. Cl.
*G01P 1/02* (2006.01)
*G01P 3/00* (2006.01)

(52) U.S. Cl.
CPC ............. *G01P 1/026* (2013.01); *G01P 3/00* (2013.01)

(58) Field of Classification Search
CPC ................................. G01P 1/026; G01P 3/00
USPC ............................................................ 73/493
See application file for complete search history.

(56) References Cited

U.S. PATENT DOCUMENTS

2020/0318995 A1* 10/2020 Imahori ................. G01D 11/02

FOREIGN PATENT DOCUMENTS

| JP | 2021146926 A | * | 9/2021 | |
| KR | 10-2016-0027316 A | | 3/2016 | |
| WO | WO-2017178204 A1 | * | 10/2017 | .............. B60T 8/76 |

OTHER PUBLICATIONS

Translation of JP-2021146926-A (Year: 2021).*
Translation of WO-2017178204-A1 (Year: 2017).*

* cited by examiner

*Primary Examiner* — Nathaniel T Woodward
(74) *Attorney, Agent, or Firm* — NovoTechIP International PLLC

(57) ABSTRACT

A wheel sensor device for a vehicle may include: a first sensor part having a first fixing hole, inserted into an insertion space of a knuckle of a vehicle, and configured to sense wheel speed of the vehicle; a second sensor part overlapping the first sensor part, inserted into the insertion part with the first sensor part, having a second fixing hole aligned with the first fixing hole, and configured to sense the wheel speed; and a fixing member fixed to a mounting structure of the knuckle through the first and second fixing holes.

18 Claims, 19 Drawing Sheets

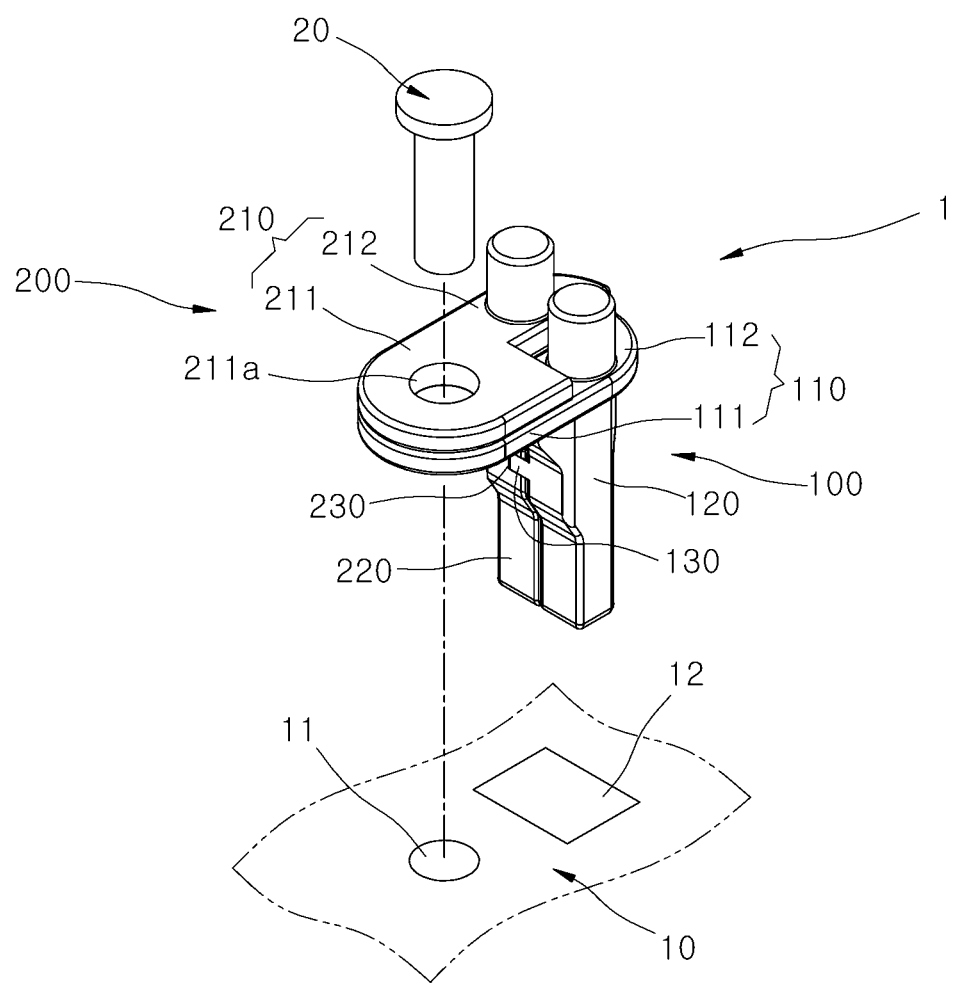

WHEEL SENSOR DEVICE FOR VEHICLE

CROSS-REFERENCE TO RELATED APPLICATION

This application claims priority from and the benefit of Korean Patent Application No. 10-2021-0005184, filed on Jan. 14, 2021, which is hereby incorporated by reference for all purposes as if set forth herein.

BACKGROUND

Field

Exemplary embodiments of the present disclosure relate to a wheel sensor device for a vehicle, and more particularly, to a wheel sensor device for a vehicle, of which the stiffness is improved and the sensor function is enhanced.

Discussion of the Background

In general, a wheel sensor device for a vehicle serves to sense the wheel speed of the corresponding wheel among four wheels of the vehicle, and input the sensed wheel speed to an electronic control unit, and is mounted on a knuckle or the like. At this time, the sensor device for a vehicle includes one sensor having an IC (Integrated Circuit). Thus, when a plurality of sensors is needed, a plurality of sensor devices for a vehicle needs to be mounted on a counterpart such as a knuckle. Therefore, a plurality of holes for mounting the plurality of sensor devices need to be formed in the counterpart. As a result, the stiffness of the counterpart may be degraded. Therefore, there is a need for a device capable of solving the problem.

The related art of the present disclosure is disclosed in Korean Patent Application Laid-Open No. 10-2016-0027316 published on Mar. 10, 2016 and entitled "Structure of Mounting Wheel Sensor for Automobile".

SUMMARY

Various embodiments are directed to a wheel sensor device for a vehicle, of which the stiffness is improved and the sensor function is enhanced.

In an embodiment, a wheel sensor device for a vehicle may include: a first sensor part having a first fixing hole, inserted into an insertion part of a knuckle of a vehicle, and configured to sense wheel speed of the vehicle; a second sensor part overlapping the first sensor part, inserted into the insertion part with the first sensor part, having a second fixing hole facing the first fixing hole, and configured to sense the wheel speed; and a fixing member fixed to a mounting part of the knuckle through the first and second fixing holes.

The first sensor part may include: a first flange part having the first fixing hole formed therein; and a first sensor head connected to the first flange part, and configured to sense the wheel speed.

The second sensor part may include: a second flange part having the second fixing hole formed therein, and overlapping the first flange part; and a second sensor head connected to the second flange part, neighboring on the first sensor head, and configured to sense the wheel speed.

The first sensor part may have a first coupling part formed on one side thereof, and the second sensor part may have a second coupling part formed on one side thereof and coupled to the first coupling part.

The second coupling part may be formed in a recess shape in the second sensor head, and the first coupling part may be formed in a hook shape protruding from the first sensor head to one side, and hooked and coupled to the second coupling part.

In an embodiment, a wheel sensor device for a vehicle may include: a first sensor part having a first fixing hole, inserted into an insertion part of a knuckle of a vehicle, and configured to sense wheel speed of the vehicle; a second sensor part overlapping the first sensor part, inserted into the insertion part with the first sensor part, having a second fixing hole facing the first fixing hole, and configured to sense the wheel speed; a third sensor part overlapping the first sensor part, inserted into the insertion part with the first and second sensor parts, having a third fixing hole facing the first and second fixing holes, and configured to sense the wheel speed; and a fixing member fixed to a mounting part of the knuckle through the first to third fixing holes.

The first sensor part may include: a first flange part having the first fixing hole formed therein; and a first sensor head connected to the first flange part, and configured to sense the wheel speed.

The second sensor part may include: a second flange part having the second fixing hole formed therein; and a second sensor head connected to the second flange part, located on one side of the first sensor head so as to neighbor on the first sensor head, and configured to sense the wheel speed.

The third sensor part may include: a third flange part having the third fixing hole formed therein; and a third sensor head connected to the third flange part, located on the other side of the first sensor head so as to neighbor on the first sensor head, and configured to sense the wheel speed.

The first sensor part may have a first-first coupling part formed on one side thereof and a first-second coupling part formed on the other side thereof, the second sensor part may have a second coupling part formed on one side thereof and coupled to the first-first coupling part, and the third sensor part may have a third coupling part formed on one side thereof and coupled to the first-second coupling part.

The first-first coupling part may be formed in a recess shape in the first sensor head, the second coupling part may be formed in a hook shape protruding from the second sensor head to one side, and hooked and coupled to the first-first coupling part, the third coupling part may be formed in a recess shape in the third sensor head, and the first-second coupling part may be formed in a hook shape protruding from the first sensor head to one side, and hooked and coupled to the third coupling part.

In an embodiment, a wheel sensor device for a vehicle may include: a first sensor part having a first fixing hole, inserted into an insertion part of a knuckle of a vehicle, and configured to sense wheel speed of the vehicle; a second sensor part overlapping the first sensor part, inserted into the insertion part with the first sensor part, having a second fixing hole facing the first fixing hole, and configured to sense the wheel speed; a third sensor part overlapping the first sensor part, inserted into the insertion part with the first and second sensor parts, having a third fixing hole facing the first and second fixing holes, and configured to sense the wheel speed; a fourth sensor part overlapping the second sensor part, inserted into the insertion part with the first to third sensor parts, having a fourth fixing hole facing the first to third fixing holes, and configured to sense the wheel speed; and a fixing member fixed to a mounting part of the knuckle through the first to fourth fixing holes.

The first sensor part may include: a first flange part having the first fixing hole formed therein; and a first sensor head connected to the first flange part, and configured to sense the wheel speed.

The second sensor part may include: a second flange part having the second fixing hole formed therein; and a second sensor head connected to the second flange part, located on one side of the first sensor head so as to neighbor on the first sensor head, and configured to sense the wheel speed.

The third sensor part may include: a third flange part having the third fixing hole formed therein; and a third sensor head connected to the third flange part, located on the other side of the first sensor head so as to neighbor on the first sensor head, and configured to sense the wheel speed.

The fourth sensor part may include: a fourth flange part having the fourth fixing hole formed therein; and a fourth sensor head connected to the fourth flange part, located on one side of the second sensor head so as to neighbor on the second sensor head, and configured to sense the wheel speed.

The first sensor part may have a first-first coupling part formed on one side thereof and a first-second coupling part formed on the other side thereof, the second sensor part may have a second-first coupling part formed on one side thereof and coupled to the first-first coupling part, and a second-second coupling part formed on the other side thereof, the third sensor part may have a third coupling part formed on one side thereof and coupled to the first-second coupling part, and the fourth sensor part may have a fourth coupling part formed on one side thereof and coupled to the second-second coupling part.

The first-first coupling part may be formed in a recess shape in the first sensor head, the third coupling part may be formed in a hook shape protruding from the third sensor head to one side, and hooked and coupled to the first-first coupling part, the second-first coupling part may be formed in a recess shape in the second sensor head, the first-second coupling part may be formed in a hook shape protruding from the first sensor head to one side, and hooked and coupled to the second-first coupling part, the fourth coupling part may be formed in a recess shape in the fourth sensor head, and the second-second coupling part is formed in a hook shape protruding from the second sensor head to one side, and hooked and coupled to the fourth coupling part.

In accordance with the embodiments of the present disclosure, the wheel sensor devices may each include the plurality of sensors. Thus, when a plurality of wheel sensor devices is installed on the knuckle, each of the wheel sensor devices does not need to be installed on a knuckle. Therefore, the degradation in stiffness of the knuckle may be prevented, which makes it possible to improve the stiffness of the knuckle. Furthermore, the sensor function may be enhanced to increase the safety performance of the vehicle system which requires autonomous driving and redundancy functions.

BRIEF DESCRIPTION OF THE DRAWINGS

FIGS. 5A and 5B are diagrams illustrating a process of assembling the wheel sensor device for a vehicle in accordance with the first embodiment of the present disclosure to a knuckle.

DETAILED DESCRIPTION OF THE ILLUSTRATED EMBODIMENTS

Hereinafter, a wheel sensor device for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
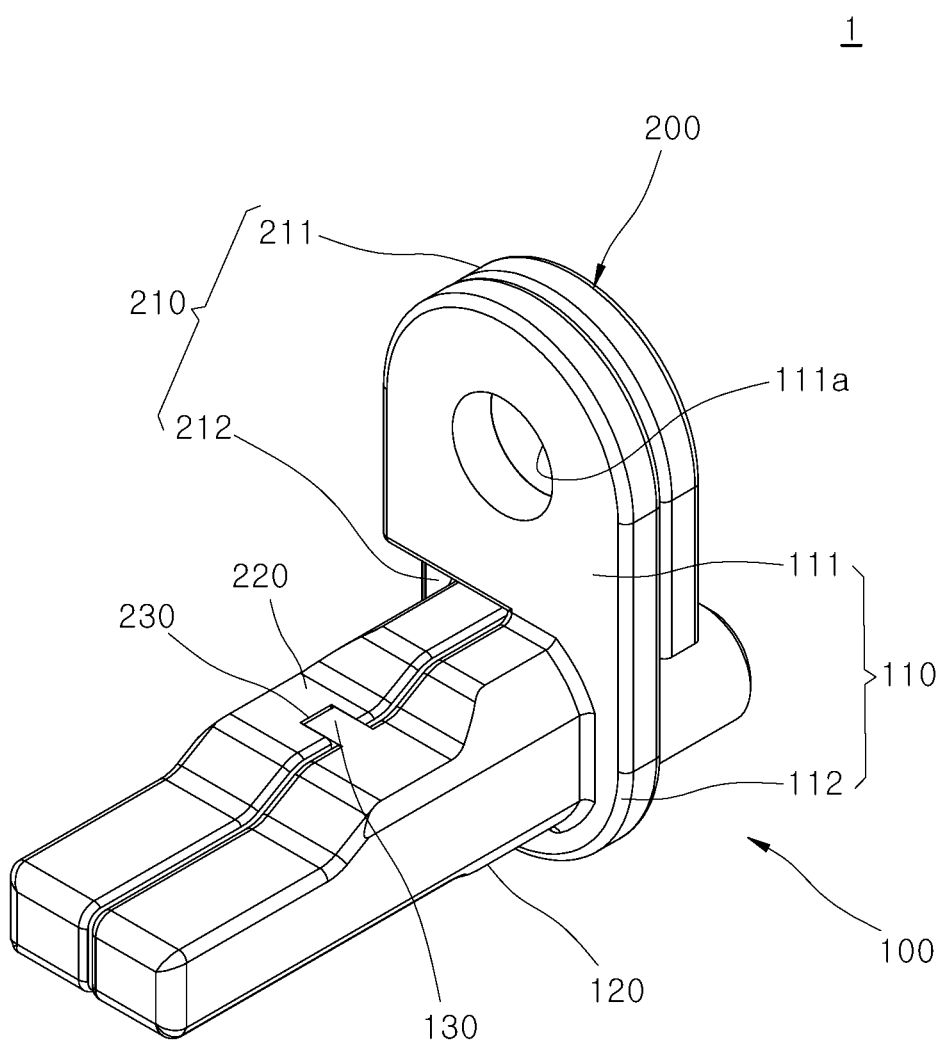
FIG. 1 is a perspective view of a wheel sensor device for a vehicle in accordance with a first embodiment of the present disclosure.
Figure 2:
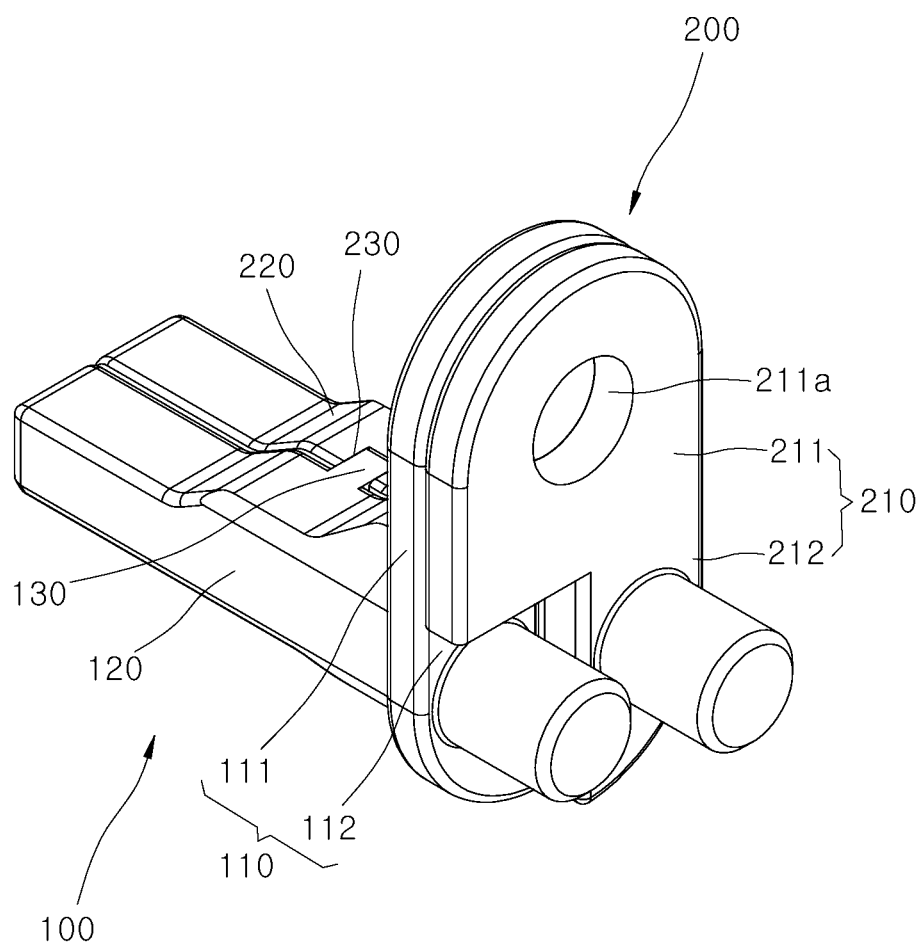
FIG. 2 is a perspective view of the wheel sensor device for a vehicle in accordance with the first embodiment of the present disclosure, when seen from a different direction.
Figure 3:
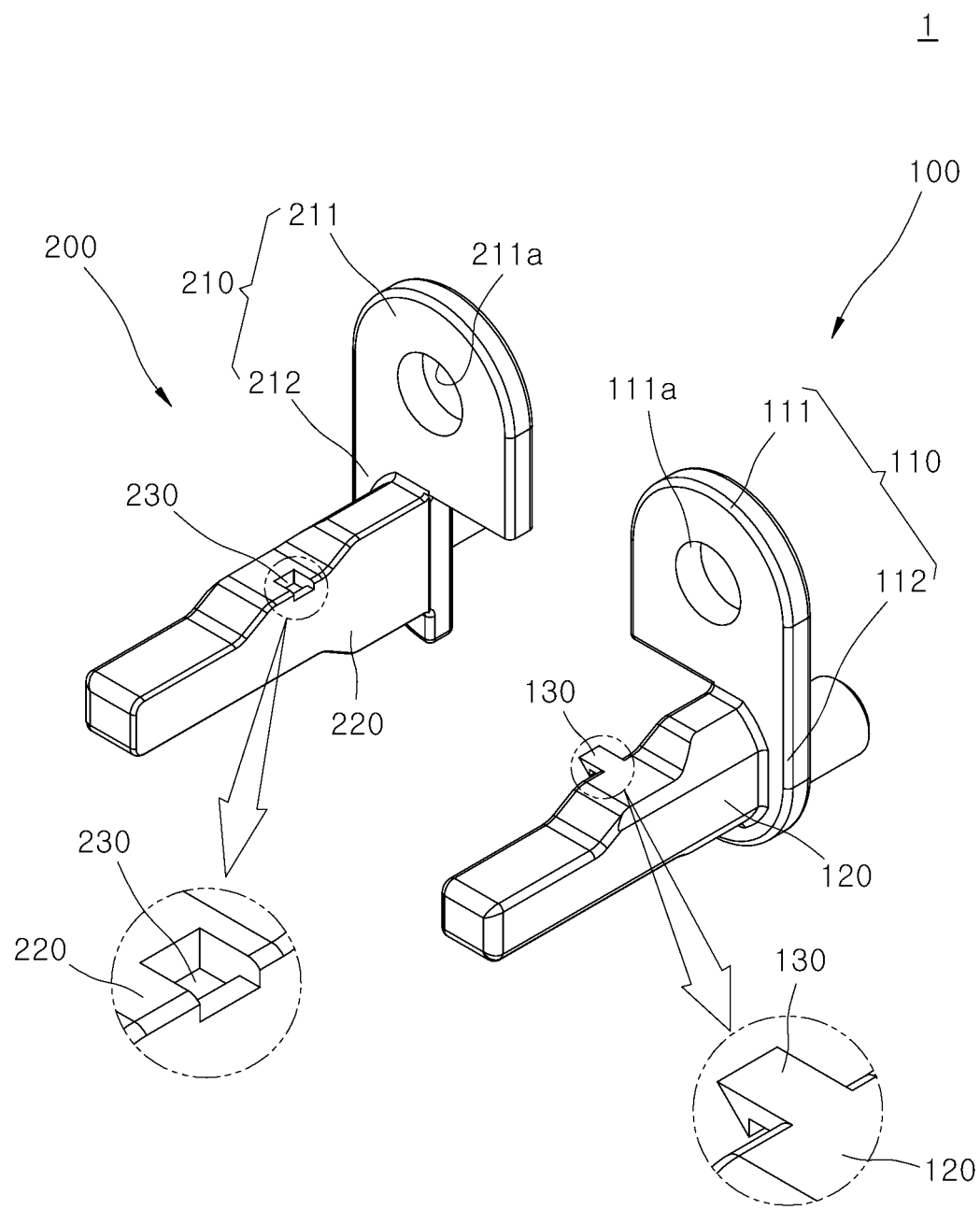
FIG. 3 is an exploded perspective view of the wheel sensor device for a vehicle in accordance with the first embodiment of the present disclosure.
Figure 4A:
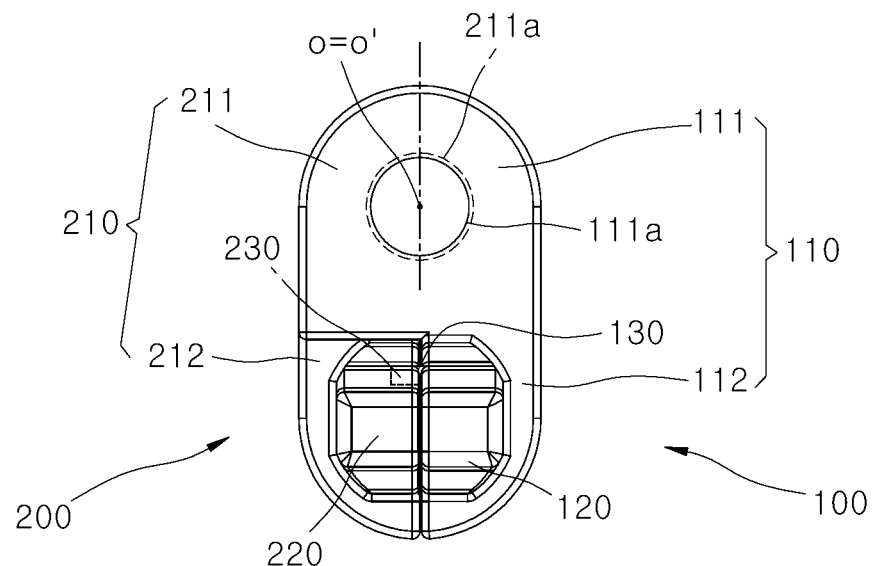
FIGS. 4A and 4B are diagrams illustrating a coupling process of the wheel sensor device for a vehicle in accordance with the first embodiment of the present disclosure.
Figure 4B:
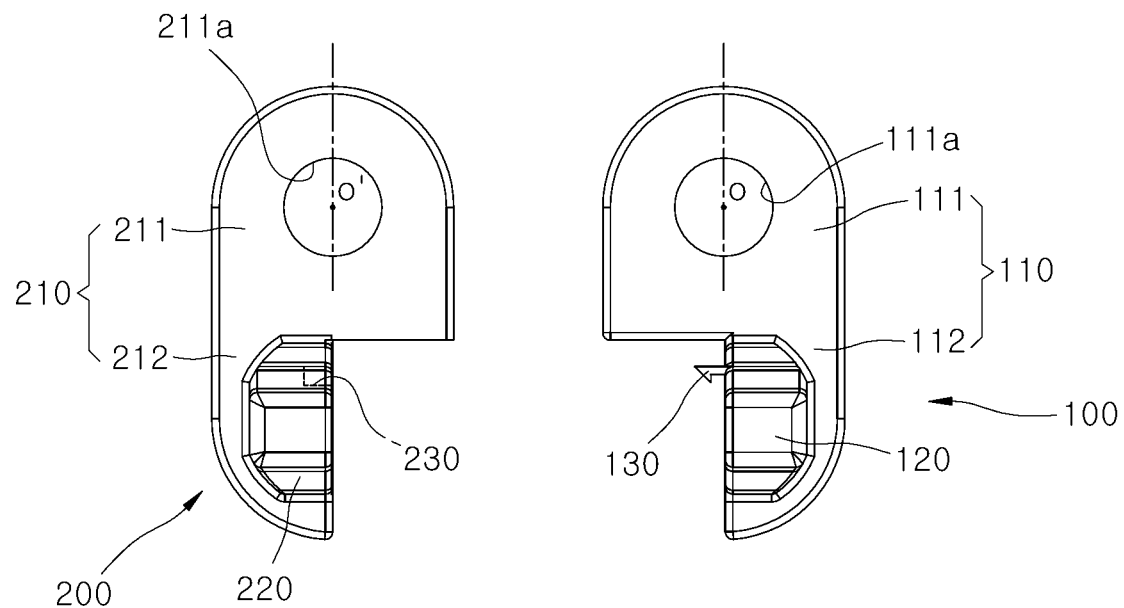
Figure 5B:
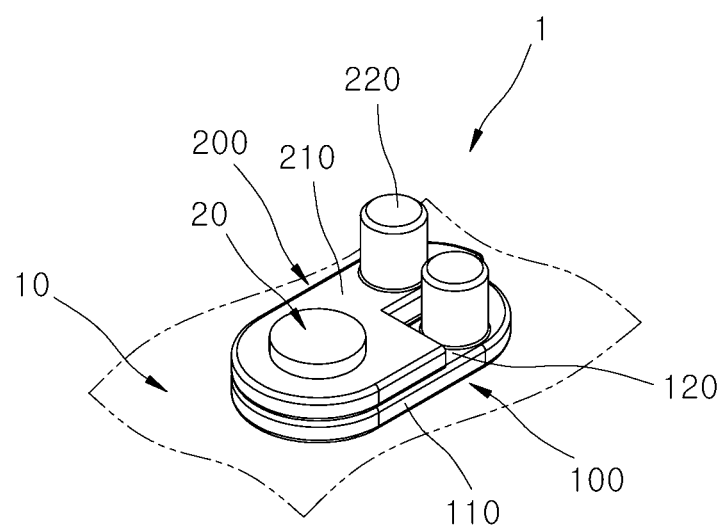

FIG. 1 is a perspective view of a wheel sensor device for a vehicle in accordance with a first embodiment of the present disclosure, FIG. 2 is a perspective view of the wheel sensor device for a vehicle in accordance with the first embodiment of the present disclosure, when seen from a different direction, FIG. 3 is an exploded perspective view of the wheel sensor device for a vehicle in accordance with the first embodiment of the present disclosure, FIGS. 4A and 4B are diagrams illustrating a coupling process of the wheel sensor device for a vehicle in accordance with the first embodiment of the present disclosure, and FIGS. 5A and 5B are diagrams illustrating a process of assembling the wheel sensor device for a vehicle in accordance with the first embodiment of the present disclosure to a knuckle.

Referring to FIGS. 1 to 5, a wheel sensor device 1 in accordance with the first embodiment of the present disclosure includes a first sensor part 100, a second sensor part 200 and a fixing member 20. The first sensor part 100 has a first fixing hole 111a, is inserted into and has a portion partially occupying an insertion part 12 of a knuckle 10 of the vehicle, and serves to sense the wheel speed of the vehicle. The insertion part 12 may include an insertion space.

The second sensor part 200 overlaps the first sensor part 100, is inserted into and has a portion partially occupying the insertion part 12 with the first sensor part 100, and has a second fixing hole 211a facing or aligned with the first fixing hole 111a. Specifically, the first and second sensor parts 100 and 200 are connected to overlap each other. At this time, the first fixing hole 111a of the first sensor part 100 and the second fixing hole 211a of the second sensor part 200 are located on the same line.

The fixing member 20 is fixed to a mounting structure 11 of the knuckle 10 through the first and second fixing holes 111a and 211a. For example, the fixing member 20 such as a bolt may be screwed to the mounting structure 11.

After the first and second sensor parts 100 and 200 are coupled to each other, the first and second sensor parts 100 and 200 are partially inserted into the insertion part 12 formed in the knuckle 10. That is, as a first sensor head 120 of the first sensor part 100 and a second sensor head 220 of the second sensor part 200 are inserted into the insertion part 12, the first fixing hole 111a of the first sensor part 100 and the second fixing hole 211a of the second sensor part 200 are disposed to face the fixing member 20 in the knuckle 10.

Then, as the fixing member 20 is coupled to the mounting structure 11 of the knuckle 10 through the first fixing hole 111a of the first sensor part 100 and the second fixing hole 211a of the second sensor part 200, the wheel sensor device 1, i.e., the first and second sensor parts 100 and 200 may be fixed to the knuckle 10.

The first sensor part 100 includes a first flange part 110 and the first sensor head 120. The first flange part 110 has the first fixing hole 111a formed therein. The first flange part 110 includes a first flange body 111 and a first flange extension 112. The first flange body 111 has a plate shape, and the first fixing hole 111a is formed in the center of the first flange body 111. The first flange extension 112 is extended from the first flange body 111 to one side, and the first sensor head 120 which will be described below is coupled to and integrated with the first flange extension 112. At this time, the first flange extension 112 is extended to the bottom (based on FIG. 4) from a position deviating from the same line as the center of the first flange body 111.

The first sensor head 120 is connected to the first flange part 110 and serves to sense wheel speed. The first sensor head 120 includes an IC (not illustrated), and senses wheel speed and transfers the sensed wheel speed to a control unit (not illustrated).

The second sensor part 200 includes a second flange part 210 and the second sensor head 220. The second flange part 210 has the second fixing hole 211a formed therein, and overlaps the first flange part 110. The second flange part 210 includes a second flange body 211 and a second flange extension 212. The second flange body 211 is formed in a plate shape, has the second fixing hole 211a formed in the center thereof, and overlaps the first flange body 111. At this time, when the second fixing hole 211a is disposed to overlap the first fixing hole 111a of the first flange body 111, the center O' of the second fixing hole 211a is located on the same line as the center O of the first fixing hole 111a.

The second flange extension 212 is extended from the second flange body 211 to one side, and the second sensor head 220 which will be described below is coupled to and integrated with the second flange extension 212. At this time, the second flange extension 212 is extended to the bottom (based on FIG. 4) from a position deviating from the same line as the center of the second flange body 211, and neighbors on the first flange extension 112. Thus, the second sensor head 220 and the first sensor head 120 may neighbor on each other.

The second sensor head 220 is connected to the second flange part 210, neighbors on the first sensor head 120, and serves to sense wheel speed. The second sensor head 220 includes an IC (not illustrated), and senses wheel speed and transfers the sensed wheel speed to the control unit (not illustrated).

The first sensor part 100 has a first coupling part 130 formed on one side thereof, and the second sensor part 200 has a second coupling part 230 formed on one side thereof and coupled to the first coupling part 130. The second coupling part 230 is formed in a recess shape in the second sensor head 220, and the first coupling part 130 is formed in a hook shape protruding from the first sensor head 120 to one side, and hooked and coupled to the second coupling part 230.

In the present embodiment, it has been described that the second coupling part 230 is formed in a recess shape, and the first coupling part 130 is formed in a hook shape. However, the present embodiment is not limited thereto, but may be designed in various shapes, as long as the first and second coupling parts 130 and 230 are coupled to each other. For example, the first coupling part 130 may be formed in a recess shape, and the second coupling part 230 may be formed in a hook shape, in different situations.

The first and second sensor parts 100 and 200 may be provisionally assembled through the first and second coupling parts 130 and 230 and then fixed to the knuckle 10. Thus, the first and second sensor parts 100 and 200 may be more easily fixed to the knuckle 10.

Figure 6:
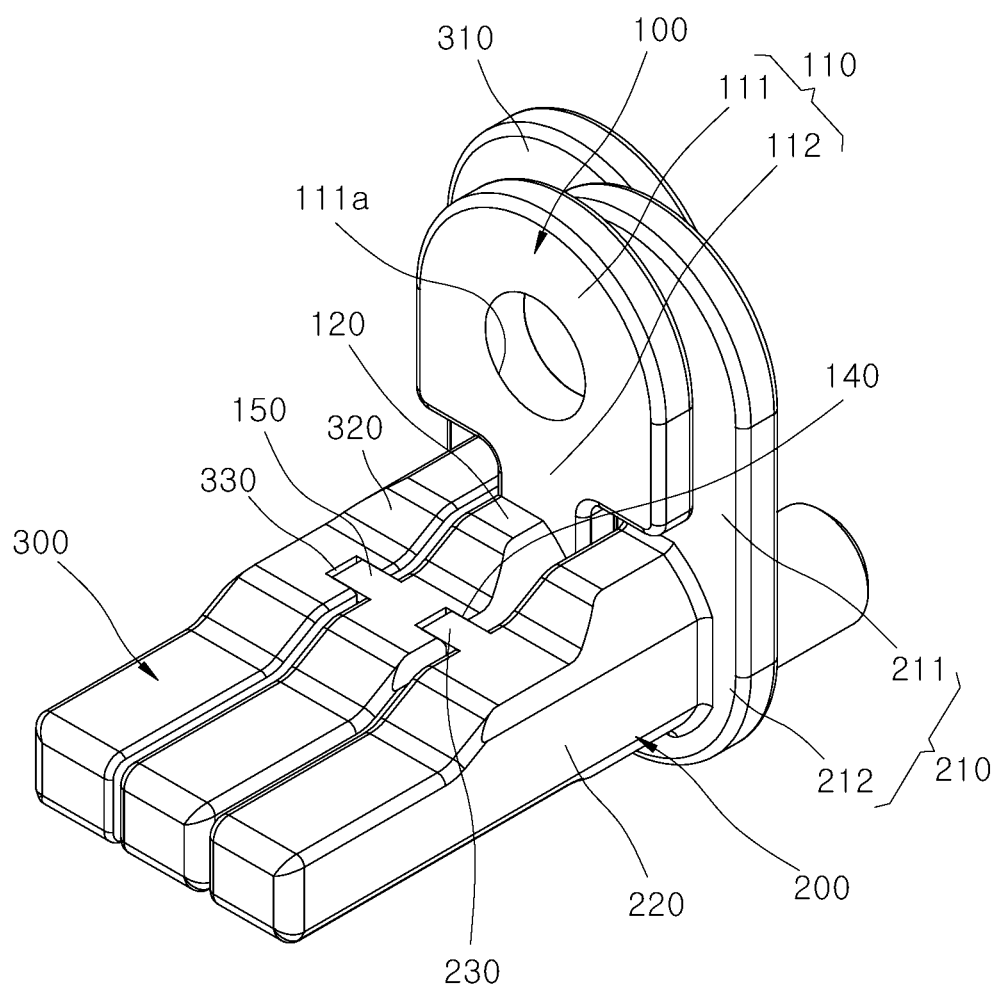
FIG. 6 is a perspective view of a wheel sensor device for a vehicle in accordance with a second embodiment of the present disclosure.
Figure 7:
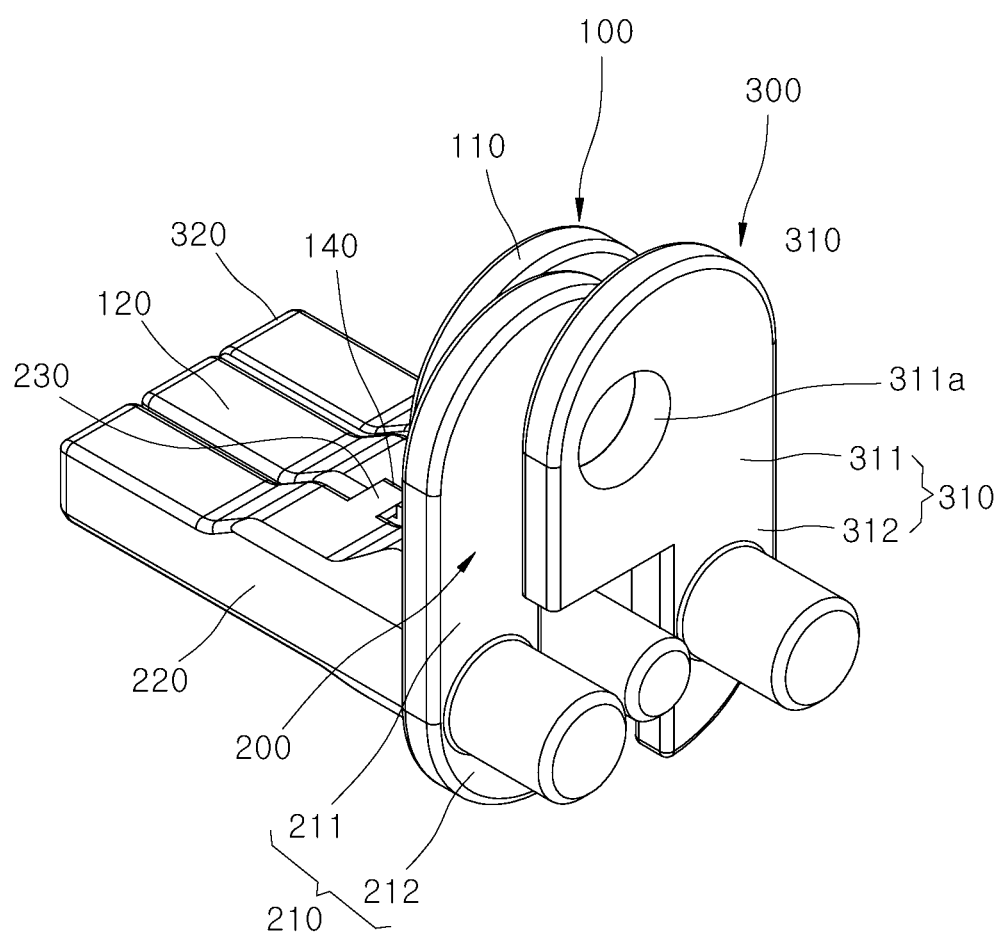
FIG. 7 is a perspective view of the wheel sensor device for a vehicle in accordance with the second embodiment of the present disclosure, when seen from a different direction.
Figure 8:
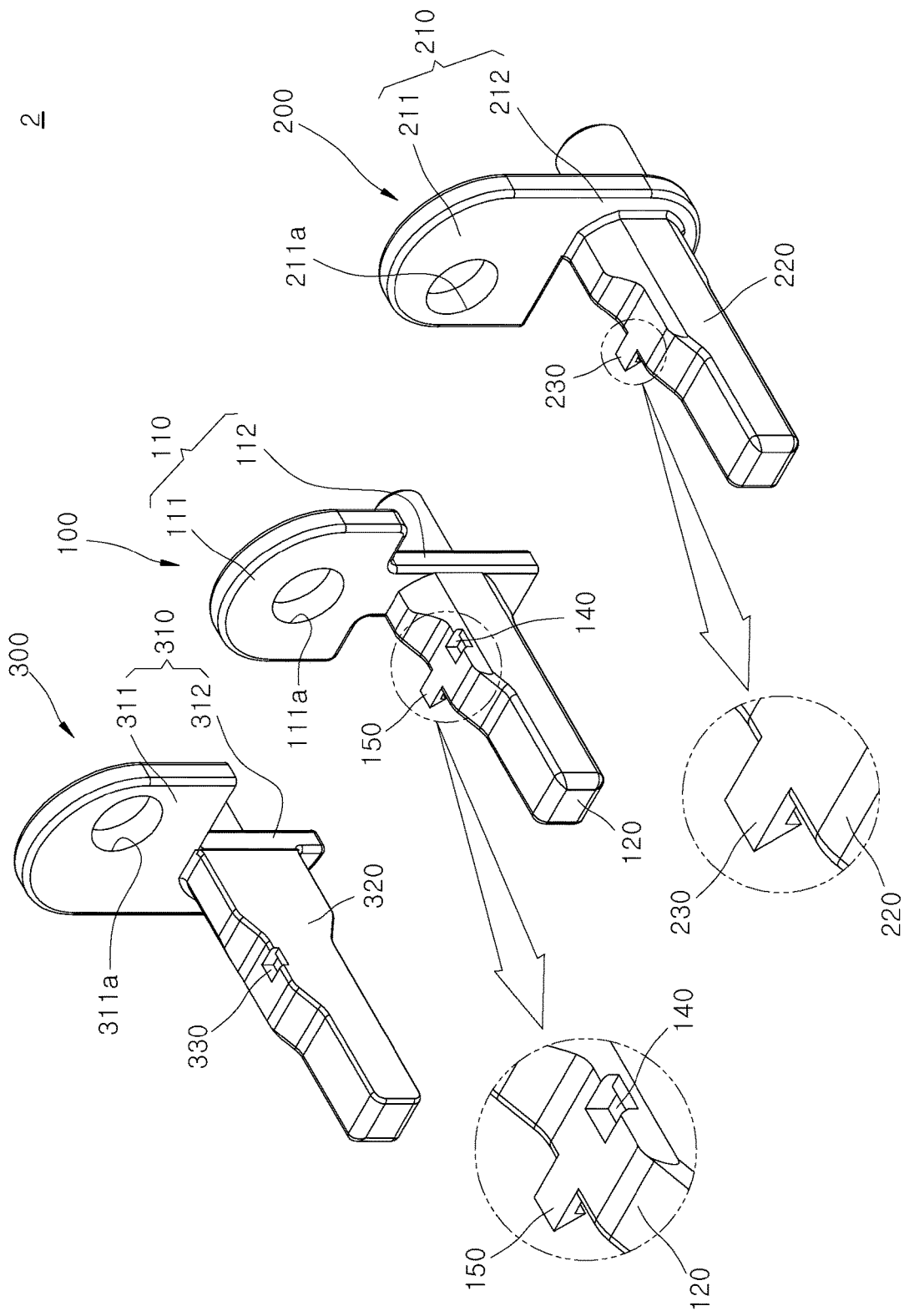
FIG. 8 is an exploded perspective view of the wheel sensor device for a vehicle in accordance with the second embodiment of the present disclosure.
Figure 9A:
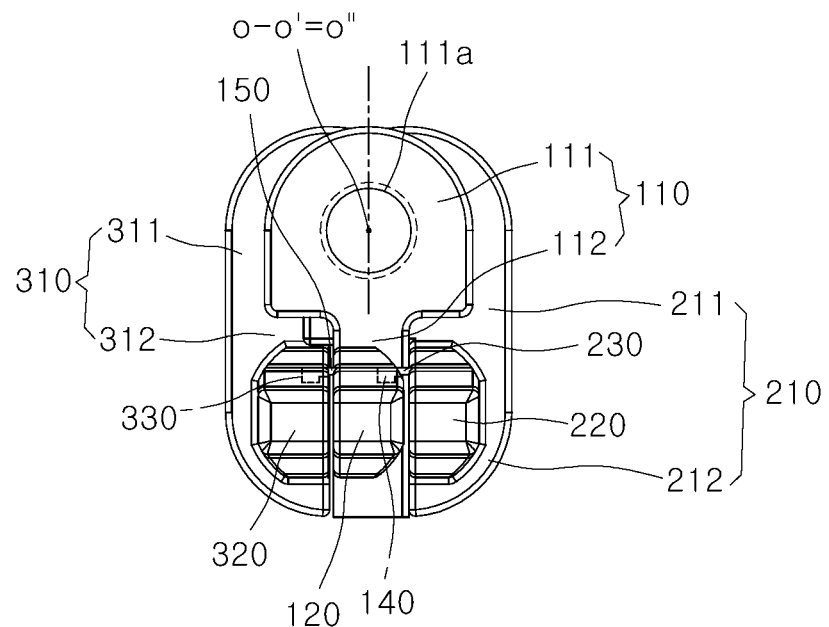
FIGS. 9A and 9B are diagrams illustrating a coupling process of the wheel sensor device for a vehicle in accordance with the second embodiment of the present disclosure.
Figure 9B:
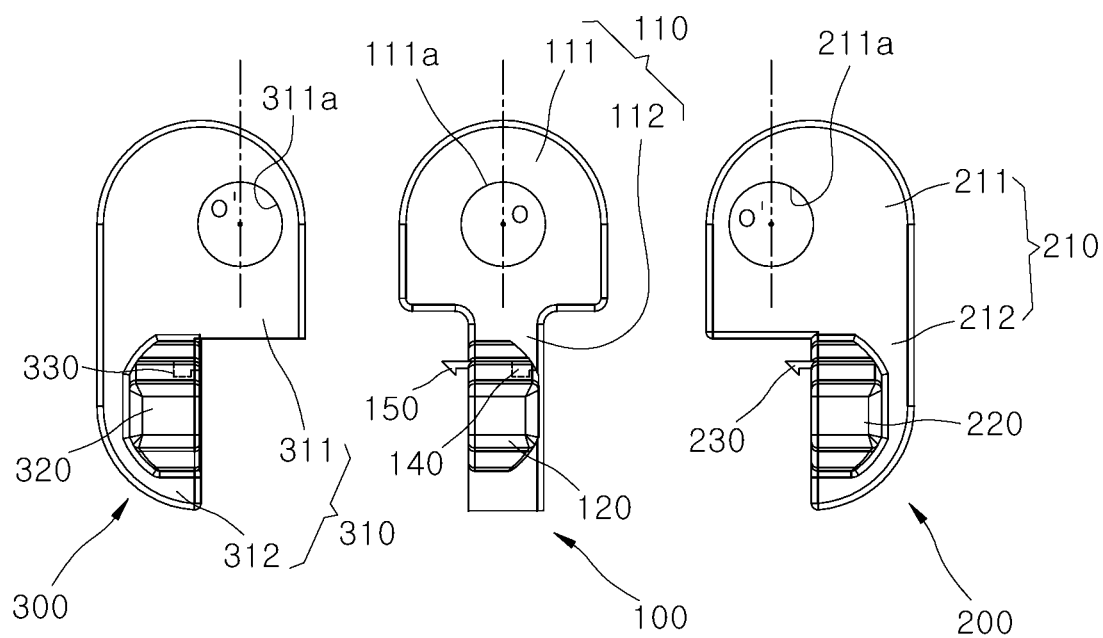
Figure 10A:
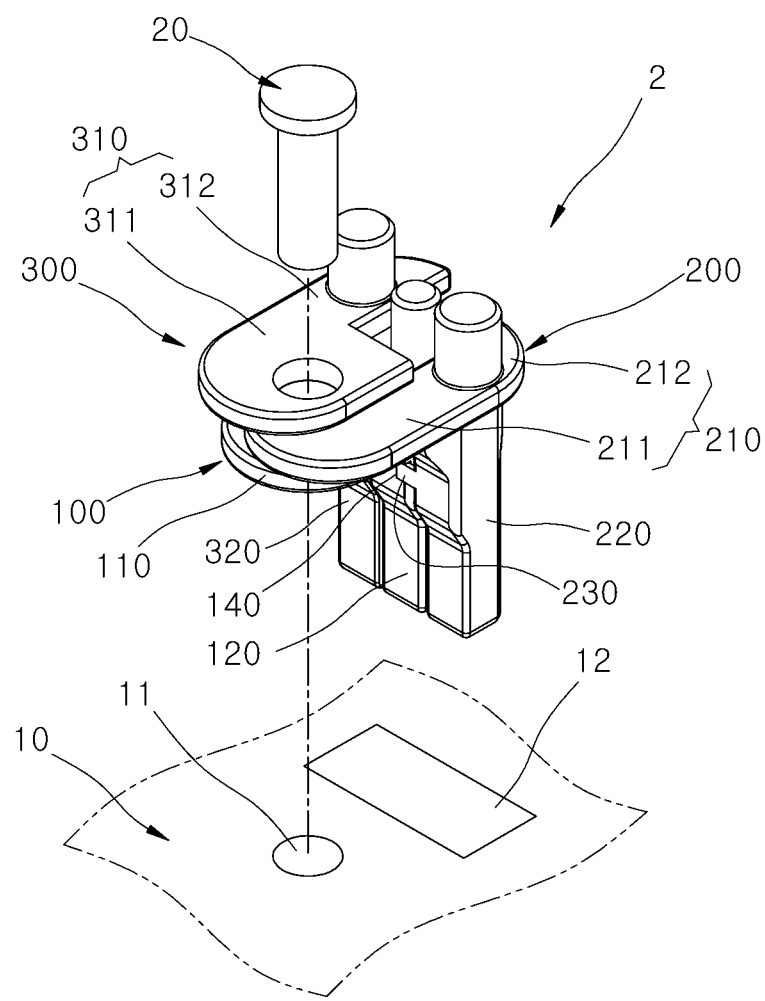
FIGS. 10A and 10B are diagrams illustrating a process of assembling the wheel sensor device for a vehicle in accordance with the second embodiment of the present disclosure to a knuckle.
Figure 10B:
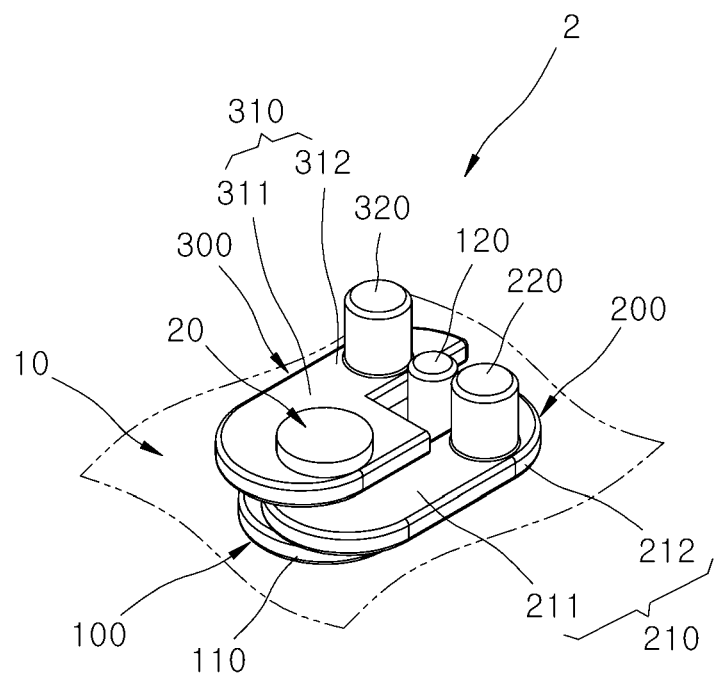

FIG. 6 is a perspective view of a wheel sensor device for a vehicle in accordance with a second embodiment of the present disclosure, FIG. 7 is a perspective view of the wheel sensor device for a vehicle in accordance with the second embodiment of the present disclosure, when seen from a different direction, FIG. 8 is an exploded perspective view of the wheel sensor device for a vehicle in accordance with the second embodiment of the present disclosure, FIGS. 9A and 9B are diagrams illustrating a coupling process of the wheel sensor device for a vehicle in accordance with the second embodiment of the present disclosure, and FIGS. 10A and 10B are diagrams illustrating a process of assembling the wheel sensor device for a vehicle in accordance with the second embodiment of the present disclosure to a knuckle.

Hereafter, a wheel sensor device 2 for a vehicle in accordance with the second embodiment of the present disclosure will be described. At this time, the detailed descriptions of the same contents of the second embodiment as those of the first embodiment will be omitted herein.

Referring to FIGS. 6 to 10, the wheel sensor device 2 in accordance with the second embodiment of the present disclosure includes a first sensor part 100, a second sensor part 200, a third sensor part 300, and a fixing member 20. The first sensor part 100 has a first fixing hole 111a, is inserted into and has a portion partially occupying an insertion part 12 of a knuckle 10 of the vehicle, and serves to sense the wheel speed of the vehicle.

The second sensor part 200 overlaps the first sensor part 100, is inserted into and has a portion partially occupying the insertion part 12 with the first sensor part 100, has a second fixing hole 211a facing or aligned with the first fixing hole 111a, and serves to sense wheel speed.

The third sensor part 300 overlaps the first sensor part 100, is inserted into and has a portion partially occupying the insertion part 12 with the first and second sensor parts 100 and 200, has a third fixing hole 311a facing or aligned with the first and second fixing holes 111a and 211a, and serves to sense wheel speed.

The fixing member 20 is fixed to a mounting structure 11 of the knuckle 10 through the first to third fixing holes 111a, 211a, and 311a. For example, the fixing member 20 such as a bolt may be screwed to the mounting structure 11.

Specifically, the first to third sensor parts 100, 200, and 300 are connected to overlap one another. At this time, the first fixing hole 111a of the first sensor part 100, the second fixing hole 211a of the second sensor part 200, and the third fixing hole 311a of the third sensor part 300 are located on the same line.

After the first to third sensor parts 100, 200, and 300 are coupled to one another, the first to third sensor parts 100, 200, and 300 are partially inserted into the insertion part 12 formed in the knuckle 10. That is, as a first sensor head 120 of the first sensor part 100, a second sensor head 220 of the second sensor part 200, and a third sensor head 320 of the third sensor part 300 are inserted into the insertion part 12, the first fixing hole 111a of the first sensor part 100, the second fixing hole 211a of the second sensor part 200, and the third fixing hole 311a of the third sensor part 300 are disposed to face the fixing member 20 in the knuckle 10.

Then, as the fixing member 20 is coupled to the mounting structure 11 of the knuckle 10 through the first fixing hole 111a of the first sensor part 100, the second fixing hole 211a of the second sensor part 200, and the third fixing hole 311a of the third sensor part 300, the wheel sensor device 2, i.e. the first to third sensor parts 100, 200, and 300 may be fixed to the knuckle 10.

The first sensor part 100 includes a first flange part 110 and the first sensor head 120. The first flange part 110 has the first fixing hole 111a formed therein. The first flange part 110 includes a first flange body 111 and a first flange extension 112. The first flange body 111 has a plate shape, and the first fixing hole 111a is formed in the center of the first flange body 111. The first flange extension 112 is extended from the first flange body 111 to one side, and the first sensor head 120 which will be described below is coupled to and integrated with the first flange extension 112. At this time, the first flange extension 112 is extended to the bottom (based on FIG. 9) from a position on the same line as the center of the first flange body 111.

The first sensor head 120 is connected to the first flange part 110 and serves to sense wheel speed. The first sensor head 120 includes an IC (not illustrated), and senses wheel speed and transfers the sensed wheel speed to a control unit (not illustrated).

The second sensor part 200 includes a second flange part 210 and the second sensor head 220. The second flange part 210 has the second fixing hole 211a formed therein, and overlaps the first flange part 110. The second flange part 210 includes a second flange body 211 and a second flange extension 212. The second flange body 211 is formed in a plate shape, has the second fixing hole 211a formed therein, and overlaps the first flange body 111. At this time, when the second fixing hole 211a overlaps the first fixing hole 111a of the first flange body 111, the center O' of the second fixing hole 211a is located on the same line as the center O of the first fixing hole 111a.

The second flange extension 212 is extended from the second flange body 211 to one side, and the second sensor head 220 which will be described below is coupled to and integrated with the second flange extension 212. At this time, the second flange extension 212 is extended to the bottom (based on FIG. 9) from a position deviating from the same line as the center of the second flange body 211, and neighbors on the first flange extension 112. Thus, the second sensor head 220 may neighbor on the first sensor head 120.

The second sensor head 220 is connected to the second flange part 210, neighbors on the first sensor head 120, and serves to sense wheel speed. The second sensor head 220 includes an IC (not illustrated), and senses wheel speed and transfers the sensed wheel speed to the control unit (not illustrated).

The third sensor part 300 includes a third flange part 310 and the third sensor head 320. The third flange part 310 has the third fixing hole 311a formed therein, and overlaps the second flange part 210. The third flange part 310 includes a third flange body 311 and a third flange extension 312. The third flange body 311 is formed in a plate shape, has the third fixing hole 311a formed therein, and overlaps the second flange body 211. At this time, when the third fixing hole 311a overlaps the first fixing hole 111a of the first flange body 111 and the second fixing hole 211a of the second flange body 211, the center O" of the third fixing hole 311a is located on the same line as the center O of the first fixing hole 111a and the center O' of the second fixing hole 211a.

The third flange extension 312 is extended from the third flange body 311 to one side, and the third sensor head 320 which will be described below is coupled to the third flange extension 312. At this time, the third flange extension 312 is extended to the bottom (based on FIG. 9) from a position deviating from the same line as the center of the third flange body 311, and neighbors on the first flange extension 112. Thus, the third sensor head 320 may be located in parallel to the first sensor head 120 and the second sensor head 220.

The third sensor head 320 is connected to the third flange part 310, located on the other side of the first sensor head 120 so as to neighbor on the first sensor head 120, and serves to sense wheel speed. The third sensor head 320 includes an IC (not illustrated), and senses wheel speed and transfers the sensed wheel speed to the control unit (not illustrated).

The first sensor part 100 includes a first-first coupling part 140 formed on one side thereof and a first-second coupling part 150 formed on the other side thereof, the second sensor part 200 includes a second coupling part 230 formed on one side thereof and coupled to the first-first coupling part 140, and the third sensor part 300 includes a third coupling part 330 formed on one side thereof and coupled to the first-second coupling part 150.

The first-first coupling part 140 is formed in a recess shape in the first sensor head 120, and the second coupling part 230 is formed in a hook shape protruding from the second sensor head 220 to one side, and hooked and coupled to the first-first coupling part 140.

The third coupling part 330 is formed in a recess shape in the third sensor head 320, and the first-second coupling part 150 is formed in a hook shape protruding from the first sensor head 120 to one side, and hooked and coupled to the third coupling part 330.

In the present embodiment, it has been described that the first-first coupling part 140 and the third coupling part 330 are formed in a recess shape, and the second coupling part 230 and the first-second coupling part 150 are formed in a hook shape. However, the present embodiment is not limited thereto, but may be designed in various shapes as long as the first-first coupling part 140, the first-second coupling part 150, the second coupling part 230, and the third coupling part 330 are coupled to one another. For example, the second coupling part 230 and the first-second coupling part 150 may be formed in a recess shape, and the first-first coupling part 140 and the third coupling part 330 may be formed in a hook shape, in different situations.

The first sensor part 100, the second sensor part 200, and the third sensor part 300 may be provisionally assembled through the first-first coupling part 140, the first-second coupling part 150, the second coupling part 230 and the third coupling part 330, and then fixed to the knuckle 10. Thus, the first sensor part 100, the second sensor part 200, and the third sensor part 300 may be more easily fixed to the knuckle 10.

Figure 11:
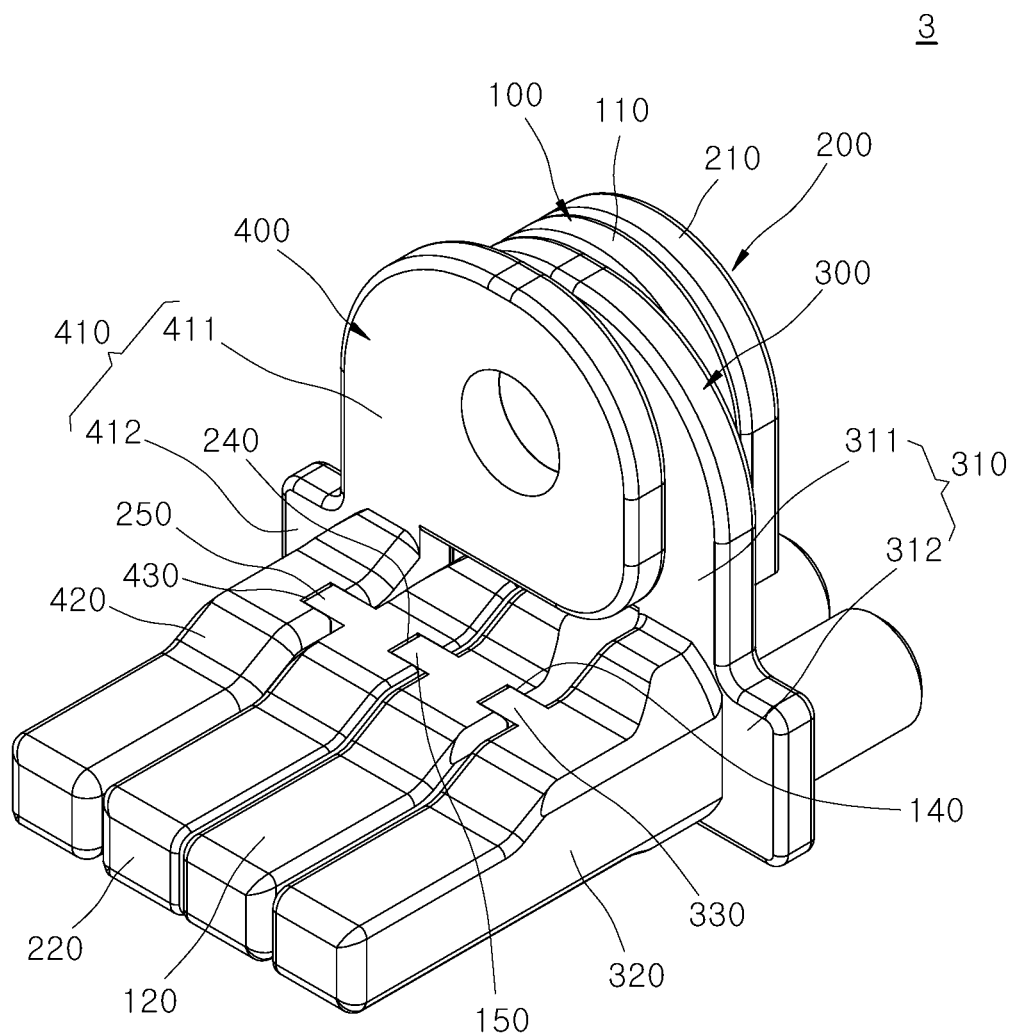
FIG. 11 is a perspective view of a wheel sensor device for a vehicle in accordance with a third embodiment of the present disclosure.
Figure 12:
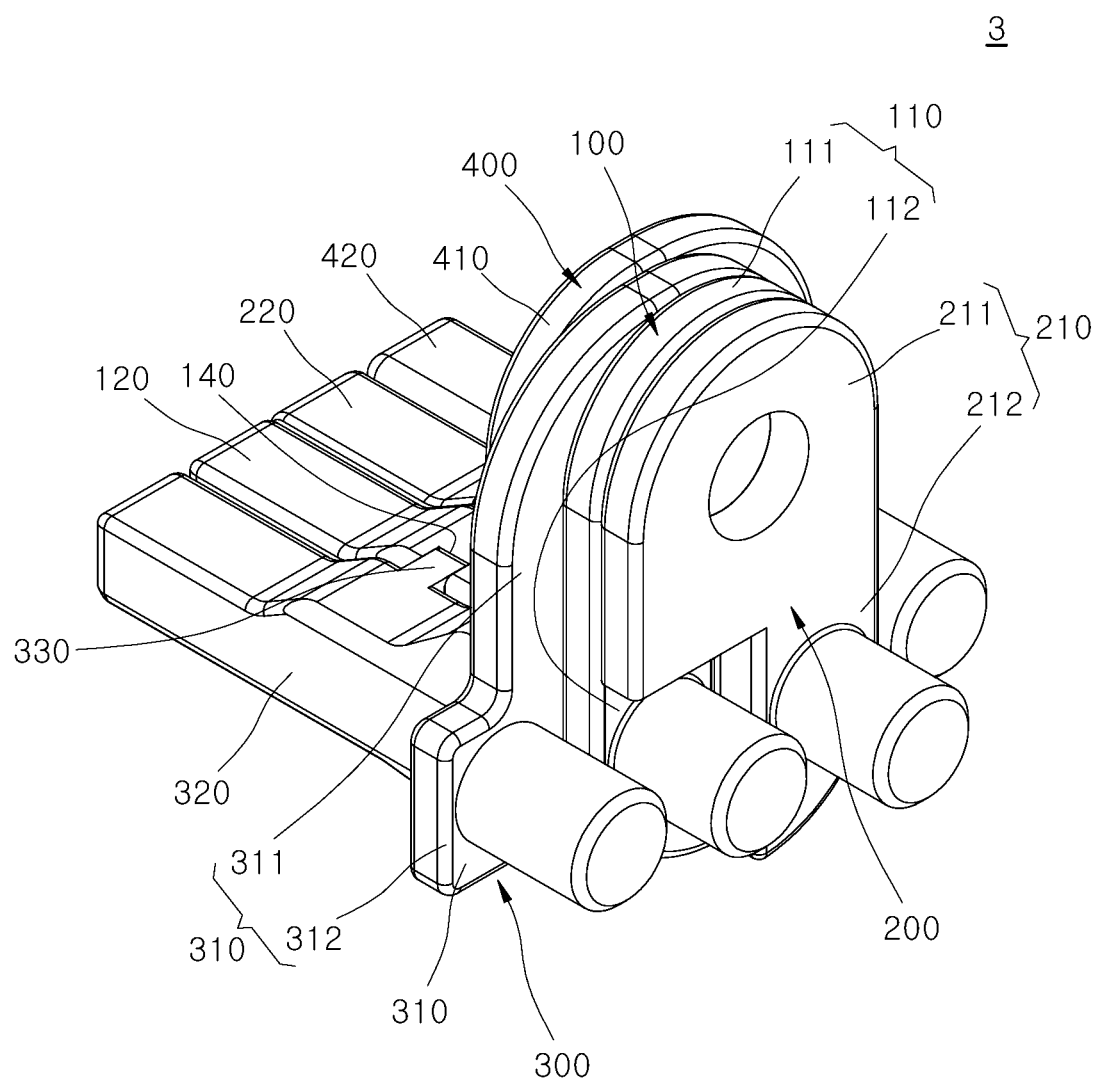
FIG. 12 is a perspective view of the wheel sensor device for a vehicle in accordance with the third embodiment of the present disclosure, when seen from a different direction.
Figure 13:
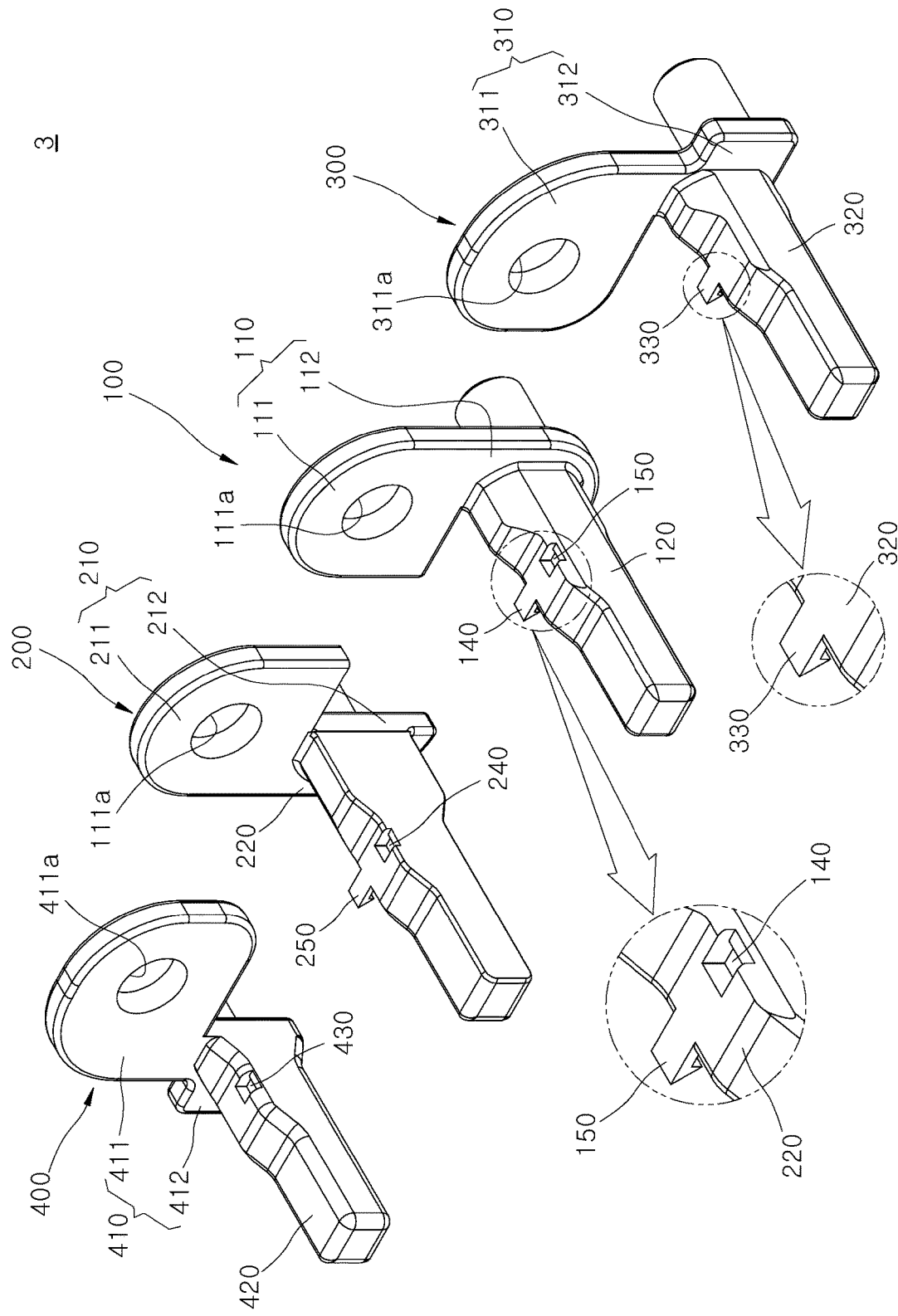
FIG. 13 is an exploded perspective view of the wheel sensor device for a vehicle in accordance with the third embodiment of the present disclosure.
Figure 14A:
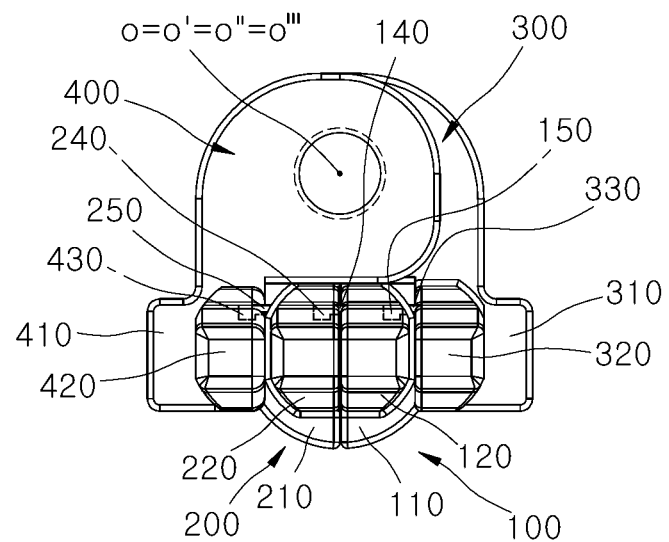
FIGS. 14A and 14B are diagrams illustrating a coupling process of the wheel sensor device for a vehicle in accordance with the third embodiment of the present disclosure.
Figure 14B:
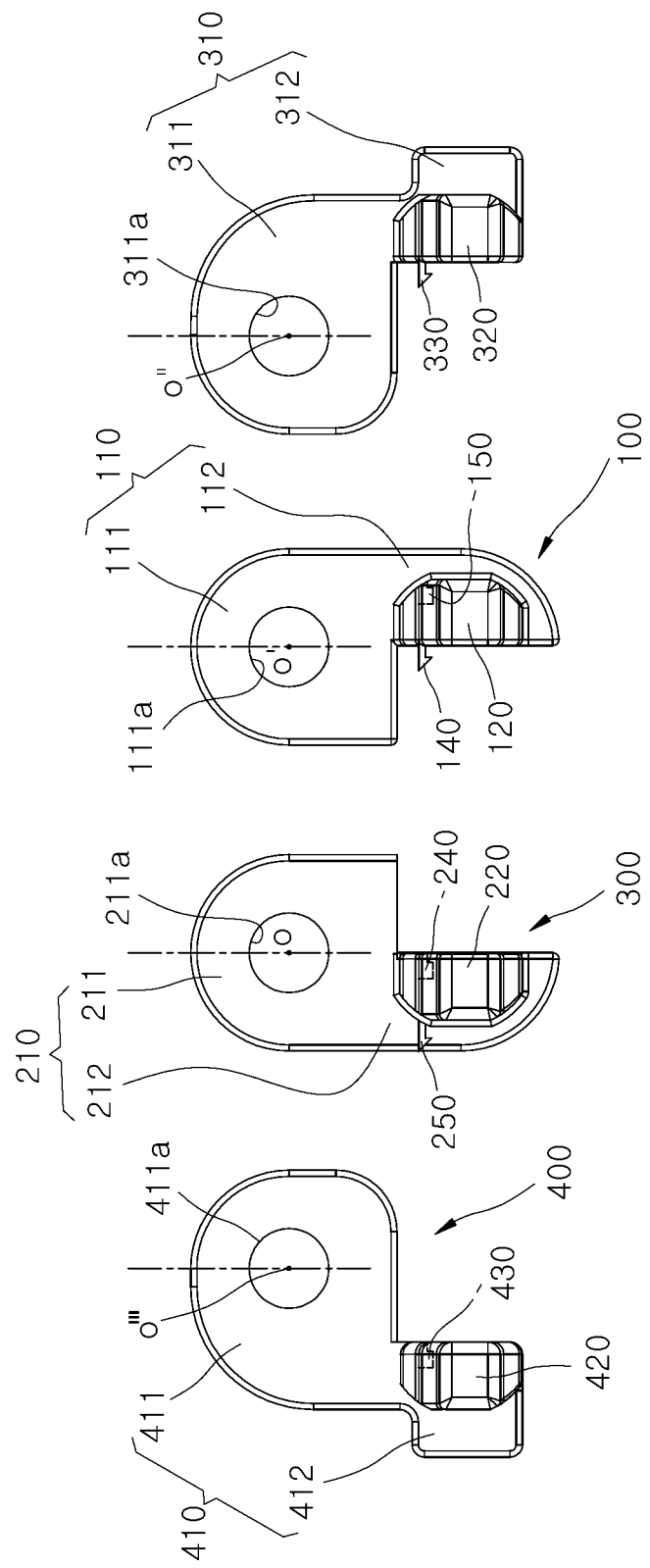
Figure 15A:
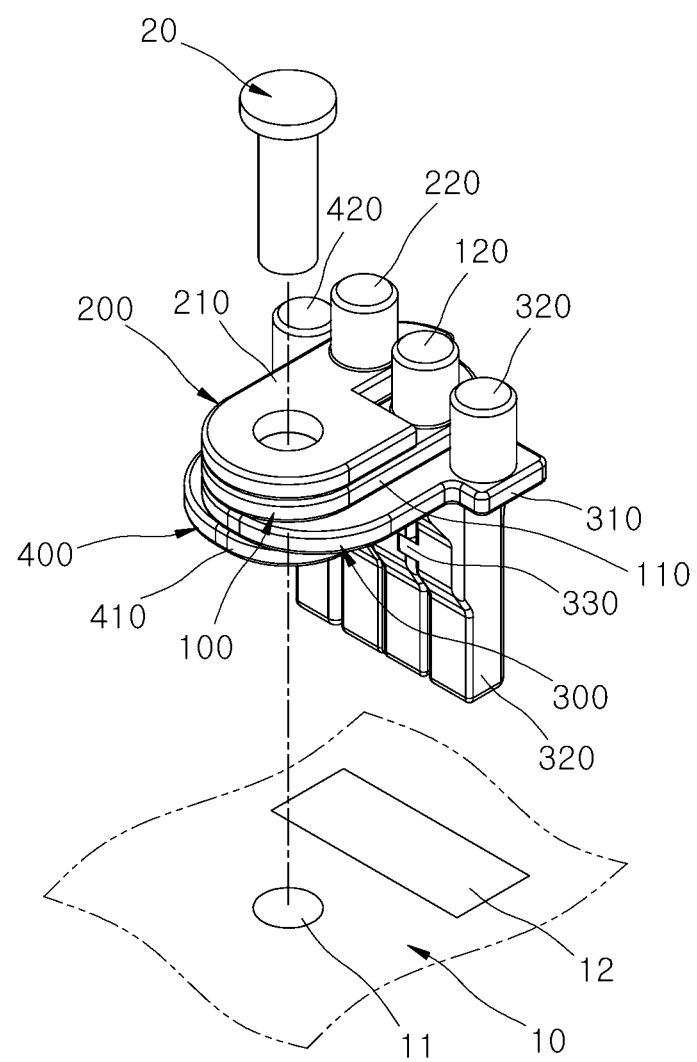
FIGS. 15A and 15B are diagrams illustrating a process of assembling the wheel sensor device for a vehicle in accordance with the third embodiment of the present disclosure to a knuckle.
Figure 15B:
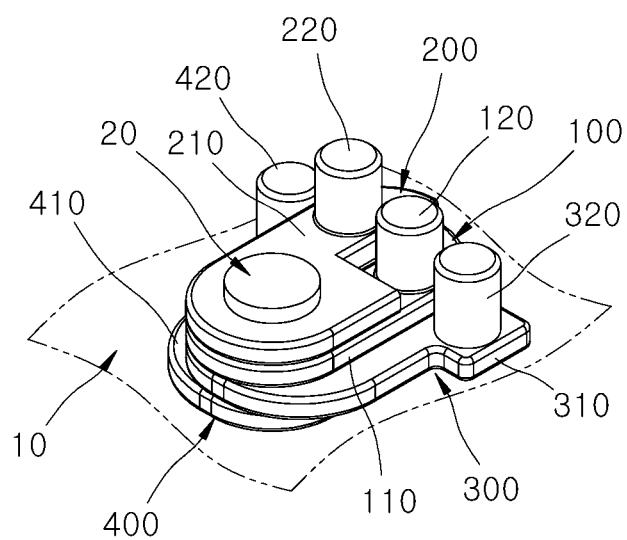

FIG. 11 is a perspective view of a wheel sensor device for a vehicle in accordance with a third embodiment of the present disclosure, FIG. 12 is a perspective view of the wheel sensor device for a vehicle in accordance with the third embodiment of the present disclosure, when seen from a different direction, FIG. 13 is an exploded perspective view of the wheel sensor device for a vehicle in accordance with the third embodiment of the present disclosure, FIGS. 14A and 14B are diagrams illustrating a coupling process of the wheel sensor device for a vehicle in accordance with the third embodiment of the present disclosure, and FIGS. 15A and 15B are diagrams illustrating a process of assembling the wheel sensor device for a vehicle in accordance with the third embodiment of the present disclosure to a knuckle Hereafter, a wheel sensor device 3 for a vehicle in accordance with the third embodiment of the present disclosure will be described. At this time, the detailed descriptions of the same contents of the third embodiment as those of the first and second embodiments will be omitted herein.

Referring to FIGS. 11 to 15, the wheel sensor device 3 in accordance with the third embodiment of the present disclosure includes a first sensor part 100, a second sensor part 200, a third sensor part 300, a fourth sensor part 400, and a fixing member 20. The first sensor part 100 has a first fixing hole 111a, is inserted into and has a portion partially occupying an insertion part 12 of a knuckle 10 of the vehicle, and serves to sense the wheel speed of the vehicle.

The second sensor part 200 overlaps the first sensor part 100, is inserted into and has a portion partially occupying the insertion part 12 with the first sensor part 100, has a second fixing hole 211a facing or aligned with the first fixing hole 111a, and serves to sense wheel speed.

The third sensor part 300 overlaps the first sensor part 100, is inserted into and has a portion partially occupying the insertion part 12 with the first and second sensor parts 100 and 200, has a third fixing hole 311a facing or aligned with the first and second fixing holes 111a and 211a, and serves to sense wheel speed.

The fourth sensor part 400 overlaps the second sensor part 200, is inserted into and has a portion partially occupying the insertion part 12 with the first to third sensor parts 100, 200 and 300, has a fourth fixing hole 411a facing or aligned with the first to third fixing holes 111a, 211a and 311a, and serves to sense wheel speed.

The fixing member 20 is fixed to a mounting structure 11 of the knuckle 10 through the first to fourth fixing holes 111a, 211a, 311a and 411a. For example, the fixing member 20 such as a bolt may be screwed to the mounting structure 11.

Specifically, the first to fourth sensor parts 100, 200, 300, and 400 are connected to overlap one another. At this time, the first fixing hole 111a of the first sensor part 100, the second fixing hole 211a of the second sensor part 200, the third fixing hole 311a of the third sensor part 300, and the fourth fixing hole 411a of the fourth sensor part 400 are located on the same line.

After the first sensor part 100, the second sensor part 200, the third sensor part 300, and the fourth sensor part 400 are coupled to one another, the first to fourth sensor parts 100, 200, 300, and 400 are partially inserted into the insertion part 12 formed in the knuckle 10. That is, as a first sensor head 120 of the first sensor part 100, a second sensor head 220 of the second sensor part 200, and a third sensor head 320 of the third sensor part 300, and a fourth sensor head 420 of the fourth sensor part 400 are inserted into the insertion part 12, the first fixing hole 111a of the first sensor part 100, the second fixing hole 211a of the second sensor part 200, the third fixing hole 311a of the third sensor part 300, and the fourth fixing hole 411a of the fourth sensor part 400 are disposed to face the fixing member 20 in the knuckle 10.

Then, as the fixing member 20 is coupled to the mounting structure 11 of the knuckle 10 through the first fixing hole 111a of the first sensor part 100, the second fixing hole 211a of the second sensor part 200, the third fixing hole 311a of the third sensor part 300, and the fourth fixing hole 411a of the fourth sensor part 400, the wheel sensor device 3, i.e. the first to fourth sensor parts 100, 200, 300, and 400 may be fixed to the knuckle 10.

The first sensor part 100 includes a first flange part 110 and the first sensor head 120. The first flange part 110 has the first fixing hole 111a formed therein. The first flange part 110 includes a first flange body 111 and a first flange extension 112. The first flange body 111 has a plate shape, and the first fixing hole 111a is formed in the center of the first flange body 111. The first flange extension 112 is extended from the first flange body 111 to one side, and the first sensor head 120 which will be described below is coupled to and integrated with the first flange extension 112. At this time, the first flange extension 112 is extended to the bottom (based on FIG. 14) from a position deviating from the same line as the center of the first flange body 111.

The first sensor head 120 is connected to the first flange part 110 and serves to sense wheel speed. The first sensor head 120 includes an IC (not illustrated), and senses wheel speed and transfers the sensed wheel speed to a control unit (not illustrated).

The second sensor part 200 includes a second flange part 210 and the second sensor head 220. The second flange part 210 has the second fixing hole 211a formed therein, and overlaps the first flange part 110. The second flange part 210 includes a second flange body 211 and a second flange extension 212. The second flange body 211 is formed in a plate shape, has the second fixing hole 211a formed therein, and overlaps the first flange body 111. At this time, when the second fixing hole 211a overlaps the first fixing hole 111a of the first flange body 111, the center O' of the second fixing hole 211a is located on the same line as the center O of the first fixing hole 111a.

The second flange extension 212 is extended from the second flange body 211 to one side, and the second sensor head 220 which will be described below is coupled to and integrated with the second flange extension 212. At this time, the second flange extension 212 is extended to the bottom (based on FIG. 14) from a position deviating from the same line as the center of the second flange body 211, and neighbors on the first flange extension 112. Thus, the second sensor head 220 may neighbor on the first sensor head 120.

The second sensor head 220 is connected to the second flange part 210, neighbors on the first sensor head 120, and serves to sense wheel speed. The second sensor head 220 includes an IC (not illustrated), and senses wheel speed and transfers the sensed wheel speed to the control unit (not illustrated).

The third sensor part 300 includes a third flange part 310 and the third sensor head 320. The third flange part 310 has the third fixing hole 311a formed therein, and overlaps the second flange part 210. The third flange part 310 includes a third flange body 311 and a third flange extension 312. The third flange body 311 is formed in a plate shape, has the third fixing hole 311a formed therein, and overlaps the second flange body 211. At this time, when the third fixing hole 311a overlaps the first fixing hole 111a of the first flange body 111 and the second fixing hole 211a of the second flange body 211, the center O" of the third fixing hole 311a is located on the same line as the center O of the first fixing hole 111a and the center O' of the second fixing hole 211a.

The third flange extension 312 is extended from the third flange body 311 to one side, and the third sensor head 320 which will be described below is coupled to the third flange extension 312. At this time, the third flange extension 312 is extended to the bottom (based on FIG. 14) from a position deviating from the same line as the center of the third flange body 311, and neighbors on the first flange extension 112. Thus, the third sensor head 320 may be located in parallel to the first sensor head 120 and the second sensor head 220.

The third sensor head 320 is connected to the third flange part 310, located on the other side of the first sensor head 120 so as to neighbor on the first sensor head 120, and serves to sense wheel speed. The third sensor head 320 includes an IC (not illustrated), and senses wheel speed and transfers the sensed wheel speed to the control unit (not illustrated).

The fourth sensor part 400 includes a fourth flange part 410 and a fourth sensor head 420. The fourth flange part 410 has the fourth fixing hole 411a formed therein, and overlaps the second flange part 210. The fourth flange part 410 includes a fourth flange body 411 and a fourth flange extension 412. The fourth flange body 411 is formed in a plate shape, has the fourth fixing hole 411a formed therein, and overlaps the second flange body 211. At this time, when the fourth fixing hole 411a overlaps the first fixing hole 111a of the first flange body 111 and the second fixing hole 211a of the second flange body 211, the center O' of the fourth fixing hole 411a is located on the same line as the center O of the first fixing hole 111a, the center O' of the second fixing hole 211a and the center O" of the third fixing hole 311a.

The fourth flange extension 412 is extended from the fourth flange body 411 to one side, and the fourth sensor head 420 which will be described below is coupled to and integrated with the fourth flange extension 412. At this time, the fourth flange extension 412 is extended to the bottom (based on FIG. 14) from a position deviating from the same line as the center of the fourth flange body 411, and neighbors on the first flange extension 112. Thus, the fourth sensor head 420 may be located in parallel to the first sensor head 120, the second sensor head 220, and the third sensor head 320.

The fourth sensor head 420 is connected to the fourth flange part 410, located on the other side of the first sensor head 120 so as to neighbor on the first sensor head 120, and serves to sense wheel speed. The fourth sensor head 420 includes an IC (not illustrated), and senses wheel speed and transfers the sensed wheel speed to the control unit (not illustrated).

The first sensor part 100 includes a first-first coupling part 140 formed on one side thereof and a first-second coupling part 150 formed on the other side thereof, the second sensor part 200 includes a second-first coupling part 240 formed on one side thereof and coupled to the first-first coupling part 140 and a second-second coupling part 250 formed on the other side thereof, the third sensor part 300 includes a third coupling part 330 formed on one side thereof and coupled to the first-second coupling part 150, and the fourth sensor part 400 includes a fourth coupling part 430 formed on one side thereof and coupled to the second-second coupling part 250.

The first-first coupling part 140 is formed in a recess shape in the first sensor head 120, the third coupling part 330 is formed in a hook shape protruding from the third sensor head 320 to one side, and hooked and coupled to the first-first coupling part 140. The second-first coupling part 240 is formed in a recess shape in the second sensor head 220, and the first-second coupling part 150 is formed in a hook shape protruding from the first sensor head 120 to one side, and hooked and coupled to the second-first coupling part 240. The fourth coupling part 430 is formed in a recess shape in the fourth sensor head 420, and the second-second coupling part 250 is formed in a hook shape protruding from the second sensor head 220 to one side, and hooked and coupled to the fourth coupling part 430.

In the present embodiment, the first-first coupling part 140, the second-first coupling part 240, and the fourth coupling part 430 are formed in a recess shape, and the first-second coupling part 150, the second-second coupling part 250, and the third coupling part 330 are formed in a hook shape. However, the present embodiment is not limited thereto, but may be designed in various shapes as long as the first-first coupling part 140, the first-second coupling part 150, the second-first coupling part 240, the second-second coupling part 250, the third coupling part 330, and the fourth coupling part 430 are coupled to one another. For example, the first-second coupling part 150, the second-second coupling part 250, and the third coupling part 330 may be formed in a recess shape, and the first-first coupling part 140, the second-first coupling part 240, and the fourth coupling part 430 may be formed in a hook shape, in different situations.

The first sensor part 100, the second sensor part 200, the third sensor part 300, and the fourth sensor part 400 may be provisionally assembled through the first-first coupling part 140, the first-second coupling part 150, the second-first coupling part 240, the second-second coupling part 250, the third coupling part 330, and the fourth coupling part 430, and then fixed to the knuckle 10. Thus, the first sensor part 100, the second sensor part 200, the third sensor part 300, and the fourth sensor part 400 may be more easily fixed to the knuckle 10.

Furthermore, it has been described that the wheel sensor devices 1 to 3 in accordance with the present embodiments include two to four sensors, respectively. However, the present disclosure is not limited thereto, but the wheel sensor device may include five or more sensors in different situation.

Furthermore, it has been described that the wheel sensor devices 1 to 3 in accordance with the present embodiments each include the plurality of sensors which neighbor on each other in a horizontal direction, i.e., a side-to-side direction (based on FIGS. 1 to 15). However, the present disclosure is not limited thereto, but the wheel sensor devices may be modified in various manners as long as a plurality of sensors are connected to constitute one sensor module. For example, a plurality of sensors may be stacked in a vertical direction, i.e., a top-to-bottom direction (based on FIGS. 1 to 15) in different situations. The sensors indicate the first sensor part 100, the second sensor part 200, the third sensor part 300, and the fourth sensor part 400 in accordance with the present disclosure.

As such, the wheel sensor devices 1 to 3 in accordance with the present disclosure may each include the plurality of sensors. Thus, when a plurality of wheel sensor devices is installed on the knuckle, each of the wheel sensor devices does not need to be installed on the knuckle 10. Therefore, the degradation in stiffness of the knuckle 10 may be prevented, which makes it possible to improve the stiffness of the knuckle 10. Furthermore, the sensor function may be enhanced to increase the safety performance of the vehicle system which requires autonomous driving and redundancy functions.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A wheel sensor for a vehicle, the vehicle including a knuckle having an insertion space and a mounting structure, the wheel sensor comprising:
   a first sensor having (1) a first fixing hole and (2) a portion partially occupying the insertion space of the knuckle, and configured to sense a wheel speed of the vehicle;
   a second sensor overlapping the first sensor, having a second fixing hole aligned with the first fixing hole and (2) a portion partially occupying the insertion space of the knuckle, and configured to sense the wheel speed; and
   a fixing member extending through the first and second fixing holes and fixed to the mounting structure of the knuckle.

2. The wheel sensor of claim 1, wherein the first sensor comprises:
   a first flange having the first fixing hole; and
   a first sensor head connected to the first flange and configured to sense the wheel speed.

3. The wheel sensor of claim 2, wherein the second sensor comprises:
   a second flange having the second fixing hole and overlapping the first flange; and
   a second sensor head connected to the second flange, positioned adjacent to the first sensor head, and configured to sense the wheel speed.

4. The wheel sensor of claim 3, wherein:
   the first sensor has a first coupling part, and
   the second sensor has a second coupling part coupled to the first coupling part.

5. The wheel sensor of claim 4, wherein:
   the second coupling part has a recess, and
   the first coupling part has a hook protruding to engage the second coupling part.

6. A wheel sensor for a vehicle, the vehicle including a knuckle having an insertion space and a mounting structure, the wheel sensor comprising:
   a first sensor having (1) a first fixing hole and (2) a portion partially occupying the insertion space of the knuckle, and configured to sense a wheel speed of the vehicle;
   a second sensor overlapping the first sensor, having (1) a second fixing hole aligned with the first fixing hole and (2) a portion partially occupying the insertion space, and configured to sense the wheel speed of the vehicle;
   a third sensor overlapping the first sensor, having (1) a third fixing hole aligned with the first and second fixing holes and (2) a portion partially occupying the insertion space, and configured to sense the wheel speed of the vehicle; and
   a fixing member extending through the first to third fixing holes and fixed to the mounting structure of the knuckle.

7. The wheel sensor of claim 6, wherein the first sensor comprises:
   a first flange having the first fixing hole; and
   a first sensor head connected to the first flange and configured to sense the wheel speed.

8. The wheel sensor of claim 7, wherein the second sensor comprises:
   a second flange having the second fixing hole; and
   a second sensor head connected to the second flange, positioned on a first side the first sensor head, and configured to sense the wheel speed.

9. The wheel sensor of claim 8, wherein the third sensor comprises:
   a third flange having the third fixing hole; and
   a third sensor head connected to the third flange, positioned on a second side of the first sensor head, and configured to sense the wheel speed.

10. The wheel sensor of claim 9, wherein:
    the first sensor has (1) a first coupling part positioned at a first side of the first sensor and (2) a second coupling part positioned at a second side of the first sensor,
    the second sensor has a coupling part coupled to the first coupling part of the first sensor, and
    the third sensor has a coupling part coupled to the second coupling part of the first sensor.

11. The wheel sensor of claim 10, wherein:
    the first coupling part of the first sensor includes a recess positioned at the first sensor head,
    the coupling part of the second sensor includes a first hook protruding from the second sensor head and configured to engage the first coupling part,
    the coupling part of the third sensor includes a recess positioned at the third sensor head, and
    the second coupling part of the first sensor includes a second hook protruding from the first sensor head and configured to engage the third coupling part.

12. A wheel sensor for a vehicle, the vehicle comprising a knuckle having an insertion space and a mounting structure, the wheel sensor comprising:
    a first sensor having (1) a first fixing hole and (2) a portion partially occupying the insertion space of the knuckle, and configured to sense a wheel speed of the vehicle;
    a second sensor overlapping the first sensor, having (1) a second fixing hole aligned with the first fixing hole and (2) a portion partially occupying the insertion space, and configured to sense the wheel speed;
    a third sensor overlapping the first sensor, having (1) a third fixing hole aligned with the first and second fixing holes and (2) a portion partially occupying the insertion space, and configured to sense the wheel speed;
    a fourth sensor overlapping the second sensor, having (1) a fourth fixing hole aligned with the first to third fixing holes and (2) a portion partially occupying the insertion space, and configured to sense the wheel speed; and a fixing member extending through the first to fourth fixing holes and fixed to the mounting structure of the knuckle.

13. The wheel sensor of claim 12, wherein the first sensor comprises:

a first flange having the first fixing hole; and a first sensor head connected to the first flange and configured to sense the wheel speed.

14. The wheel sensor of claim 13, wherein the second sensor comprises:

a second flange having the second fixing hole; and a second sensor head connected to the second flange, facing a first side of the first sensor head, and configured to sense the wheel speed.

15. The wheel sensor of claim 14, wherein the third sensor comprises:

a third flange having the third fixing hole; and a third sensor head connected to the third flange, facing a second side of the first sensor head, and configured to sense the wheel speed.

16. The wheel sensor of claim 15, wherein the fourth sensor comprises:

a fourth flange having the fourth fixing hole; and a fourth sensor head connected to the fourth flange, facing the second sensor head, and configured to sense the wheel speed.

17. The wheel sensor of claim 16, wherein:

the first sensor has (1) a first coupling part positioned at a first side of the first sensor, and (2) a second coupling part positioned at a second side of the first sensor, the second sensor has (1) a first coupling part positioned at a first side of the second sensor and coupled to the first coupling part of the first sensor, and (2) a second coupling part positioned at a second side of the second sensor, the third sensor has a coupling part coupled to the second coupling part of the first sensor, and the fourth sensor has a coupling part coupled to the second coupling part of second sensor.

18. The wheel sensor of claim 17, wherein:

the first coupling part of the first sensor includes a recess positioned at the first sensor head, the coupling part of the third sensor includes a hook protruding from the third sensor head and configured to engage the first coupling part, the first coupling part of the second sensor includes a recess positioned at the second sensor head, the second coupling part of the first sensor includes a hook protruding from the first sensor head and configured to engage the first coupling part of the second sensor, the coupling part of the fourth sensor includes a recess positioned at the fourth sensor head, and the second coupling part of the second sensor includes a hook protruding from the second sensor head and configured to engage the coupling part of the fourth sensor.

* * * * *